United States Patent [19]
Christopher

[11] Patent Number: 5,190,074
[45] Date of Patent: Mar. 2, 1993

[54] CHECK VALVE APPARATUS

[76] Inventor: Gilman O. Christopher, 924 W. 11th Pl., Mesa, Ariz. 85201

[21] Appl. No.: 871,106

[22] Filed: Apr. 20, 1992

[51] Int. Cl.⁵ .......................................... F16K 17/168
[52] U.S. Cl. .................................. 137/495; 137/510; 251/364; 251/900
[58] Field of Search ...................... 137/493, 495, 510; 251/364, 900

[56] References Cited

U.S. PATENT DOCUMENTS

| | | | |
|---|---|---|---|
| 455,853 | 7/1891 | Shepard | 137/538 |
| 2,258,335 | 10/1941 | Moore | 137/510 X |
| 2,670,922 | 4/1951 | Carlisle et al. | 137/540 |
| 2,731,981 | 1/1956 | Glasser | 137/536 |
| 2,778,598 | 1/1957 | Bolling | 251/364 X |
| 2,886,058 | 5/1959 | Horton | 137/484.2 |
| 2,960,998 | 11/1960 | Sinker et al. | 137/542 |
| 2,977,980 | 4/1961 | Scholin | 137/538 |
| 3,943,969 | 3/1976 | Rubin et al. | 137/538 |
| 4,245,667 | 1/1981 | Braukmann | 137/493 |
| 4,682,625 | 7/1987 | Christopher | 137/538 |

Primary Examiner—Robert G. Nilson
Attorney, Agent, or Firm—H. Gordon Shields

[57] ABSTRACT

Check valve apparatus for a fluid flow operates in response to a positive pressure of the fluid to move a spring biased diaphragm and valve element off its seat to allow the fluid to flow through the apparatus. When the pressure of the fluid flow drops, the valve is urged against its seat to provide a positive stop to the fluid flow. The valve apparatus includes a stem extending exteriorly of a housing in which the apparatus is disposed so that the valve may be manually opened by moving the valve off its seat to clear debris without contaminating the hands of the person working on the valve.

11 Claims, 1 Drawing Sheet

CHECK VALVE APPARATUS

BACKGROUND OF THE INVENTION

1. Field of the Invention

This invention relates to check valves and, more particularly, to a check valve having a manually releasable valve and particularly adapted for use in the aircraft spray business.

2. Description of the Prior Art

U.S. Pat. No. 4,682,625, the inventor of which is the inventor of the present apparatus, discloses a spring loaded shutoff valve apparatus designed primarily for crop dusting purposes. The valve apparatus of the '625 patent includes a piston movable in a stepped bore. The stepped bore includes a lesser bore portion having an inside diameter which is substantially the same as the outer diameter of the piston. Movement of the piston into a greater bore portion having a substantially larger diameter than the diameter of the piston allows fluid to flow into the stepped bore and through a connecting bore outwardly of the valve housing. The piston is spring biased into the lesser diameter bore portion of the stepped bore to prevent fluid flow.

As is well known and understood in crop dusting, the fluid to be sprayed typically contains debris and the like. The debris may clog a valve or at least result in dripping until the valve is unclogged.

In the prior art, it is generally necessary to disassemble the valve to clear debris. The disassembly results in the contamination of the hands of the person who disassembles the valve.

The present invention allows debris to be cleared without the disassembly of the valve and without the contamination of a worker.

SUMMARY OF THE INVENTION

The invention described and claimed herein comprises a check valve particularly adapted for use when liquid materials are sprayed from an aircraft and where there needs to be a very fast reacting cutoff of the spray material when the primary spray pressure is released, such as when the aircraft comes to the end of a field, and the like. The apparatus includes a housing connected to an intake conduit through which fluid flows into the housing. Within the housing there is a sleeve connected directly to a bore through which the liquid flows out of the housing. The end of the sleeve remote from the bore comprises a valve seat. A valve housing is connected to the main housing, and a diaphragm is secured to the valve housing and to the main housing. A valve is secured to the diaphragm and the diaphragm and valve are spring loaded to the shutoff position, with the valve disposed on the seat. Fluid pressure within the housing biases the diaphragm and the valve away from the sleeve and accordingly fluid flows out of the main housing. When the pressure of the fluid is released, the diaphragm under the spring bias seats the valve to cut off the flow of fluid through the housing.

Among the objects of the present invention are the following:

To provide new and useful valve apparatus;

To provide new and useful check valve apparatus;

To provide new and useful check valve apparatus having an external element for moving a valve element off its seat;

To provide new and useful check valve apparatus having a spring biased diaphragm to which is secured a valve element; and To provide new and useful valve apparatus having a primary housing, a sleeve disposed within the valve housing, a valve seat on the sleeve, and a valve element movable in response to fluid pressure away from the valve seat.

DESCRIPTION OF THE PREFERRED EMBODIMENT

Figure 1:
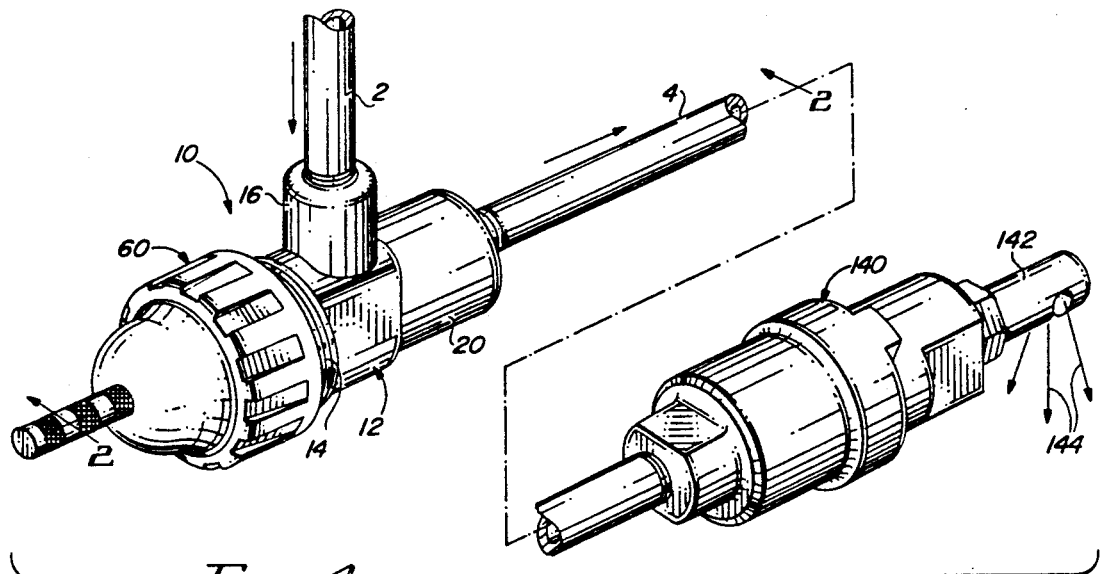
FIG. 1 comprises and exploded perspective view of the apparatus of the present invention illustrating its use environment.

FIG. 1 comprises a perspective view of valve apparatus 10 of the present invention secured to a nozzle assembly 140. The valve apparatus 10 includes an intake conduit 2 connected to a primary housing 12 and an output conduit 4 extending from the main housing 12 to the nozzle assembly 140.

Figure 2:
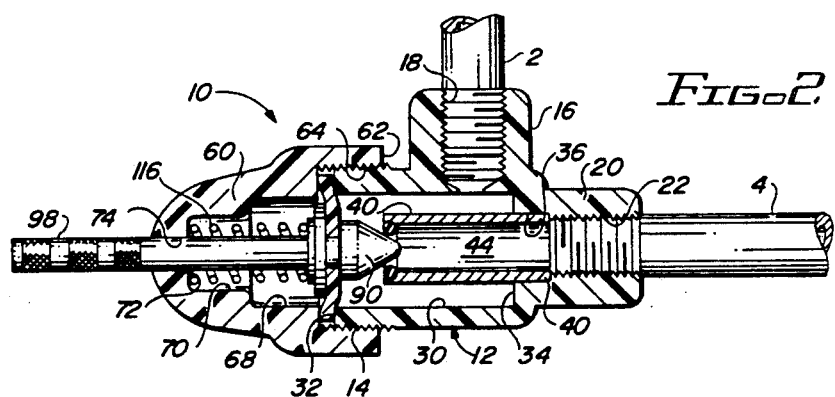
FIG. 2 is a view in partial section taken generally along line 2—2 of FIG. 1.

FIG. 2 comprises a side view in partial section of the valve apparatus 10 of FIG. 1, taken generally along line 2—2 of FIG. 1. The valve apparatus 10 includes the primary housing 12 to which is secured a valve housing 60.

Figures 3A, 3B:
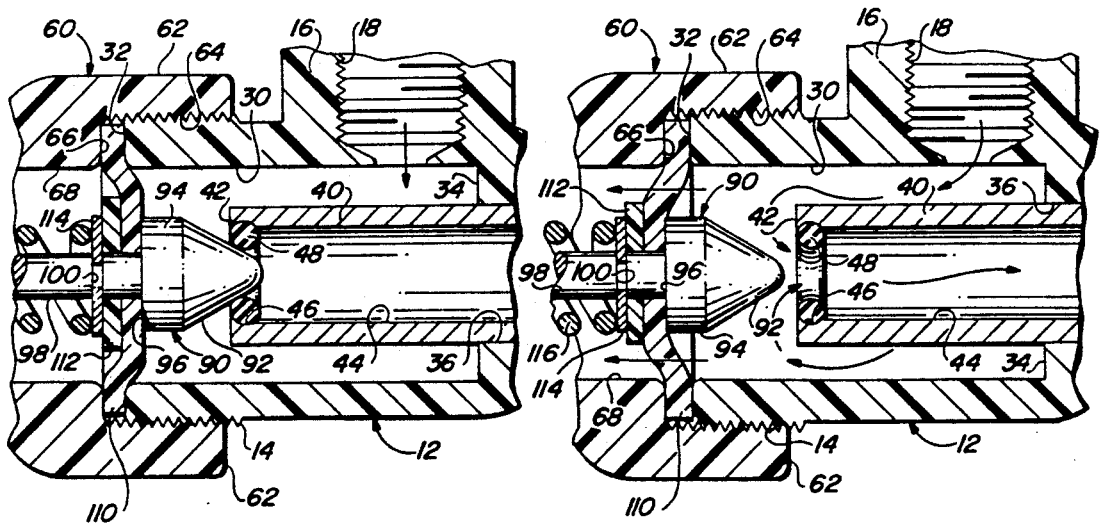
FIG. 3A is an enlarged view in partial section of a portion of the apparatus of FIG. 2.
FIG. 3B is a view in partial section illustrating sequentially the operation of the apparatus shown in FIG. 3A.

FIGS 3A and 3B comprise enlarged views of a portion of the primary housing 12 and the valve housing 60 illustrating sequentially the operation of the valve apparatus 10. For the following discussion, reference will be made to FIGS. 1, 2, 3A and 3B.

The primary housing 12 includes an externally threaded portion 14 to which the valve housing 60 is secured. A connector boss 16 extends upwardly from the primary housing 12. The connector boss 16 includes an internally threaded bore 18 to which the intake conduit 2 is secured.

The internally threaded bore 18 communicates with an internal bore 30 within the primary housing 12.

The primary housing 12 also includes a nozzle connector portion 20 remote from the valve housing 60. The nozzle connector portion 20 includes an internally threaded bore 22. The output conduit 4 is appropriately secured to the internally threaded bore 22.

The internally threaded bore 22 also communicates with the internal bore 30 within the primary housing 12. There is an end face 32 at one end of the primary housing 12, and an end wall 34 generally parallel to but remote from the end face 32. A connecting bore 36 extends through the end wall 34 to connect the bore 30 with the bore 22.

A sleeve 40 is appropriately disposed within the bore 30 and secured in the connecting bore 36. The sleeve 40 includes an outer end 42 remote from the connecting bore 36. Extending through the sleeve 40 is a bore 44. The bore 44 communicates directly with the bore 22, and accordingly with the output conduit 4. The bore 44 also communicates with the bore 30 within the primary housing 12.

Adjacent to the outer end or end face 42, and within the bore 44, there is an o-ring groove 46. An o-ring 48 is disposed in the o-ring groove 46. The o-ring 48 comprises a valve seat for a valve 90.

The valve housing 60 includes an end face 62, and an internally threaded portion 64 extends rearwardly from the end face 62. The internally threaded portion 64 matingly engages the externally threaded portion 14 of the primary housing 12.

A shoulder 66 extends generally radially inwardly from the internally threaded portion 64 remote from the end face 62. The shoulder 66 comprises a transition area between the internally threaded bore portion 64 and a bore 68. The bore 68 extends rearwardly to an end wall 72 remote from the face 62. The bore 68 includes a stepped portion or counter bore 70 adjacent to the end wall 72.

A pin or stem bore 74 extends through the end wall 72. The pin or stem bore 74 is generally coaxially aligned with the bore 44 and the o-ring/valve seat 48 of the sleeve 40.

A valve 90 is shown in FIGS. 2 and 3A in its seated or closed position. The valve 90 includes a conical tip 92 and a cylindrical portion 94 extending rearwardly from the conical tip 92. The conical tip 92 extends into and sealingly engages the o-ring 48 to close the bore 44 from the bore 30. The valve 90 in its seated position prevents the flow of fluid from the bore 30 into the bore 44 and outwardly of the valve apparatus 10 through the output conduit 4.

There is a generally flat face 96 on the valve 90 remote from the conical tip. The face 96 comprises a rear face of the cylindrical portion 94. The face 96 is generally perpendicular to the longitudinal axis of the bores 30, 44, 68 and 70.

Extending rearwardly or outwardly from the face 96 of the valve 90 is a stem 98. The stem 98 extends through the bores 68, 70, and 74. The stem 98 extends outwardly from the valve housing 60 and comprises an element for longitudinally moving the valve 90 relative to its seat on the sleeve 40.

There is a generally a circumferentially extending groove 100 about the stem 98 a relatively short distance away from the face 96. The groove 100 receives a lock clip 114 to secure a diaphragm 100, and a diaphragm follower 112, to the valve 90.

The outer periphery of the diaphragm 100 is appropriately secured or clamped between the shoulder 66 of the valve housing 60 and the end face 32 of the primary housing 12. The diaphragm 110 is disposed against the end face 96 of the valve 90.

The diaphragm follower or plate 112 is disposed against the diaphragm 110 on the opposite side of the diaphragm from the face 96. That is, the diaphragm 110 is disposed against the face 96 on one side of the diaphragm and against the diaphragm follower 112 on the opposite side of the diaphragm. The lock clip 114 in the groove 100 secures the diaphragm 110, the follower 112, and the valve 90 together as a unit.

A compression spring 116 extends from the clip 114 and the diaphragm follower 112 to the end wall 72 of the valve housing 60. The compression spring 116 urges the diaphragm 110, and accordingly the valve 90, to the closed position with the tip 92 of the valve 90 sealingly engaging the o-ring 48.

Referring particularly to FIGS. 3A and 3B, when fluid pressure through the bore 18 from the intake conduit 2 provides sufficient pressure in the bore 30 and against the diaphragm 110 to overcome the force or bias of the compression spring 116, the valve 90 will move to the left from the position shown in FIG. 3A to the position shown in FIG. 3B. In FIG. 3B, the valve 90 is shown withdrawn from its seat in the sleeve 40, and accordingly is in its open position. Fluid accordingly flows, as indicated by the large arrows in FIG. 3B, from the bore 18 into the bore 30, and into and through the bore 44 of the sleeve 40 and outwardly from the valve apparatus 10. The fluid then flows through the output conduit 4 and into the nozzle assembly 140.

The nozzle assembly 140 includes a nozzle 142, and spray 140 is shown extending downwardly, or spraying downwardly, from the nozzle 142. The spray 144 of FIG. 1 sequentially follows or is coincident with, the valve arrangement illustrated in FIG. 3B.

When the pressure of the fluid flowing into the primary housing 12, and specifically into the bore 30 and against the diaphragm 110, drops below the pressure or force provided by the compression spring 116, the valve 90 will seat against the O-ring 48 to seal the bore 44 from the bore 30. Fluid flow will accordingly cease from the bore 30 into the bore 44, and outwardly through the bore 22 and the output conduit 4 to the nozzle assembly 140.

However, for purposes of draining the system on the ground, the stem 98 may be pulled to overcome the bias of the spring 116 and unseat the valve 90. This will allow any accumulated fluid, etc., to drain from the nozzle assembly 140 without taking the apparatus apart. A person accordingly does not come in direct contact with the fluid as the system is drained.

A catch can or drip can may easily be held beneath the nozzle 142 of the nozzle assembly 140 to catch any accumulated fluid and debris washed through the valve. This prevents contamination of the ground beneath the nozzle. The apparatus 10 accordingly is environmentally safe for both the user or person who works on or services the apparatus as well as the ground itself.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Check valve apparatus comprising, in combination:
   housing means for receiving a flow of fluid;
   a primary bore in the housing means;
   a sleeve disposed in the housing means, including
   a bore communicating with the primary bore and through which fluid flows from the primary bore out of the housing means,
   an outer end,
   a groove in the bore adjacent to the outer end, and
   an o-ring in the groove defining a valve seat; and
   valve means securable to the housing means, including
   a valve housing,
   a valve disposed against the valve seat and movable in response to fluid pressure to move away from the valve seat to allow fluid to flow in the primary bore, and stem means secured to the valve and extending outwardly from the valve housing for manually moving the valve away from the valve seat.

2. The apparatus of claim 1 in which the valve moves relative to the sleeve to allow fluid to flow from the primary bore in the housing means to the bore in the sleeve.

3. The apparatus of claim 2 in which the valve means further includes a diaphragm secured to and disposed between the valve housing and the housing means.

4. The apparatus of claim 3 in which the valve means further includes means for biasing the valve against the valve seat.

5. The apparatus of claim 1 in which the housing means further includes
- an end wall comprising an end of the primary bore,
- a connecting bore extending through the end wall through which fluid flows from the housing means from the primary bore, and
- a sleeve connected to the connecting bore and having a bore for receiving the flow of fluid from the primary bore.

6. The apparatus of claim 5 in which movement of the valve away from the o-ring valve seat allows fluid to flow from the primary bore into the bore of the sleeve and out of the housing means.

7. The apparatus of claim 6 in which the valve means further includes a diaphragm secured to the valve housing and to the housing means, and the valve is secured to and movable in response to movement of the diaphragm.

8. The apparatus of claim 7 in which the valve means further includes a compression spring biasing the diaphragm and the valve against the valve seat.

9. The apparatus of claim 1 in which the housing means includes
- a housing,
- a connector boss extending outwardly from the housing for connecting the housing to a supply of fluid,
- a nozzle connector portion for connecting to a nozzle for spraying the fluid, and
- the primary bore is disposed within the housing and communicates with the connector boss and with the nozzle connector portion and receives the flow of fluid from the connector boss and the fluid flows out of the primary bore to the nozzle connector portion.

10. The apparatus of claim 9 in which the housing means further includes a sleeve disposed in the primary bore and communicating with the nozzle connector portion and through which fluid flows from the primary bore out of the apparatus.

11. The apparatus of claim 10 in which the valve seat is disposed in the sleeve, and movement of the valve controls fluid flow through the sleeve.

* * * * *